United States Patent [19]

Koscica et al.

[11] Patent Number: 5,486,992

[45] Date of Patent: Jan. 23, 1996

[54] HIGH VOLTAGE DIRECT CURRENT POWER SUPPLY WITH FEEDBACK CONTROL AND CIRCUIT PROTECTION

[75] Inventors: Thomas E. Koscica, Clark; William C. Drach, Tinton Falls, both of N.J.

[73] Assignee: The United States of America as represented by the Secretary of the Army, Washington, D.C.

[21] Appl. No.: 370,590

[22] Filed: Jan. 9, 1995

[51] Int. Cl.$^6$ .................................................. H02M 3/335
[52] U.S. Cl. .................. 363/21; 363/58; 363/59; 363/97
[58] Field of Search .................. 363/21, 55, 56, 363/57, 58, 59, 60, 95, 97, 131, 16

[56] References Cited

U.S. PATENT DOCUMENTS

| | | | |
|---|---|---|---|
| 3,818,128 | 6/1974 | Chambers et al. | 178/6.8 |
| 4,073,004 | 2/1978 | Chambers et al. | 363/79 |
| 4,757,433 | 7/1988 | Santelmann, Jr. | 363/19 |
| 5,363,288 | 11/1994 | Castell et al. | 363/21 |

*Primary Examiner*—Peter S. Wong
*Assistant Examiner*—Adolf Berhane
*Attorney, Agent, or Firm*—Michael Zelenka; William H. Anderson

[57] ABSTRACT

A high voltage direct current power supply having feedback control and a protection circuit for maintaining a controlled, stabilized output voltage. An oscillator is coupled to a transformer which in turn is coupled to a voltage multiplier. A feedback control is coupled to the transformer and the voltage multiplier which provides feedback to the transformer for maintaining an accurate, stable output voltage. Coupled to the feedback control is a protection circuit which prevents the output voltage from exceeding a predetermined output voltage. Additionally, the protection circuit shuts down the power supply if a short circuit occurs at the output. In one embodiment, the voltage multiplier is comprised of a plurality of voltage doubler diode and capacitor pairs. The feedback control is comprised of a comparitor and a buffer which drives a transistor coupled to the primary of the transformer, which acts as a feedback loop. The protection circuit includes a J-K flip-flop.

8 Claims, 2 Drawing Sheets

HIGH VOLTAGE DIRECT CURRENT POWER SUPPLY WITH FEEDBACK CONTROL AND CIRCUIT PROTECTION

GOVERNMENT INTEREST

The invention described herein may be manufactured, used, and licensed by or for the Government of the United States of America for governmental purposes without the payment to us of any royalty thereon.

FIELD OF THE INVENTION

This invention relates in general to high voltage direct current power supplies, and more particularly to a controlled, stable, protected high voltage direct current power supply.

BACKGROUND OF THE INVENTION

Power supplies are required in the operation of many electrical devices. There are a wide variety of power supplies including batteries, fuel cells, electro-mechanical generators, alternating current to direct current supplies, inverters, and alternating current supplies, among many others. While there are many power supplies that perform adequately for their intended purpose, many of these power supplies are expensive or do not perform optimally. Many power supplies have an output voltage that may fluctuate over time and under varying loads and conditions. Many have complex controls that are difficult to maintain and are expensive.

Therefore, in many applications, especially those requiring a high voltage direct current power supply, there is a need for a controlled stabilized power supply having short circuit and over-voltage protection.

SUMMARY OF THE INVENTION

The high voltage DC power supply of the present invention uses feedback to provide a stable, accurate voltage source having over-voltage and short circuit protection. An oscillator produces a square wave which is coupled to a transformer. The transformer is coupled to a voltage multiplier. The voltage multiplier provides additional multiplication of the voltage as well as rectification. Coupled to the transformer and the voltage multiplier is a feedback control. The input or primary side of the transformer is coupled to the feedback control. Also coupled to the feedback control is a protection circuit. The protection circuit can override the feedback control. If the voltage output exceeds a predetermined value or is shorted, the protection circuit forces the high voltage output terminal to zero until the power supply is reset.

Accordingly, it is an object of the present invention to provide a high voltage direct current power supply that is accurately controlled.

It is another object of the present invention to provide a high voltage direct current power supply that is stable over circuit thermal changes.

It is an advantage of the present invention that external circuitry is protected from over-voltage conditions.

It is another advantage of the present invention that a user and external circuitry are protected from short circuits.

It is a feature of the present invention that a feedback control is used.

It is another feature of the present invention that an over-voltage set point can be established at a predetermined value.

These and other objects, advantages, and features will be readily apparent in view of the following more detailed description.

DETAILED DESCRIPTION OF THE PREFERRED EMBODIMENTS

Figure 1:
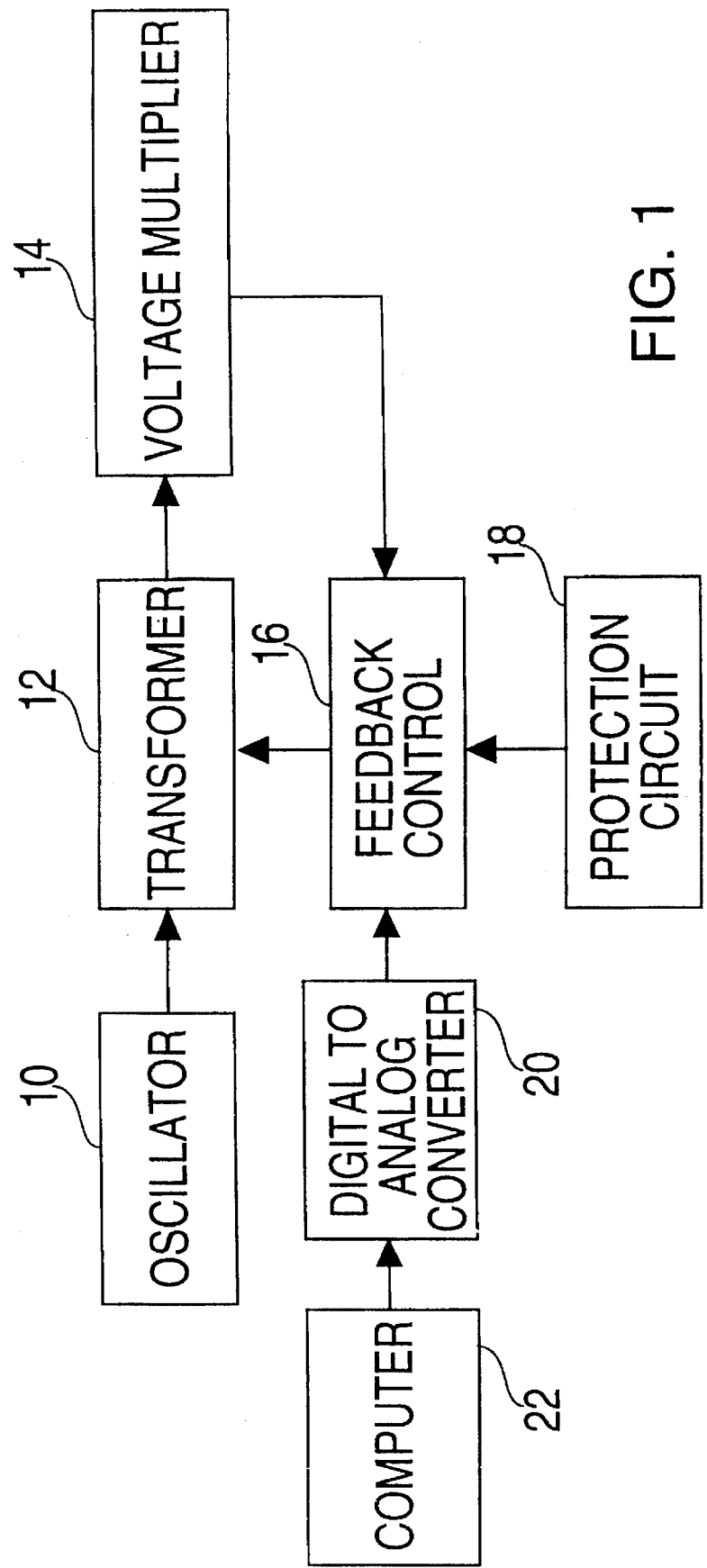
FIG. 1 is a block diagram illustrating the present invention.

Referring to FIG. 1, an oscillator 10 is coupled to the primary of a transformer 12. The secondary of the transformer 12 is coupled to a voltage multiplier 14. The voltage multiplier 14 is coupled to a feedback control 16. The feedback control 16 is additionally coupled to the primary of transformer 12. Coupled to the feedback control 16 is a protection circuit 18. Also coupled to the feedback control 16 is a digital to analog converter 20 which receives input from a computer 22.

In operation, the oscillator 10 produces a square wave. The square wave is applied to the primary of the transformer 12. The transformer 12 is a step-up transformer, which increases the voltage. The output of the secondary of transformer 12 is applied to a voltage multiplier 14. The voltage multiplier 14 additionally increases the voltage as well as providing rectification. The voltage multiplier 14 may be composed of a plurality of voltage doubler diode and capacitor pairs or a voltage ladder. The input side of the primary of the step-up transformer 12 is controlled by the feedback control 16. The feedback control 16 stabilizes the high voltage output. Protection circuit 18 is coupled to the feedback control 16. The protection circuit 18 can override the feedback control 16 if the output voltage exceeds a predetermined maximum value, or if the output is shorted. The protection circuit 18 forces the high voltage output to zero until the circuit is reset. A digital to analog converter 20 is coupled to the feedback control 16. The digital to analog converter 20 provides an analog signal to the feedback control 16 which permits the power supply to provide an accurate and stable voltage output ranging, for example, from zero to two thousand volts. A computer 22 provides the digital input to the digital to analog converter 20. Therefore, the voltage of the high voltage DC power supply is controlled by the computer 22. This permits microprocessor control of the high voltage output, making possible automation of the operation of the power supply.

Figure 2:
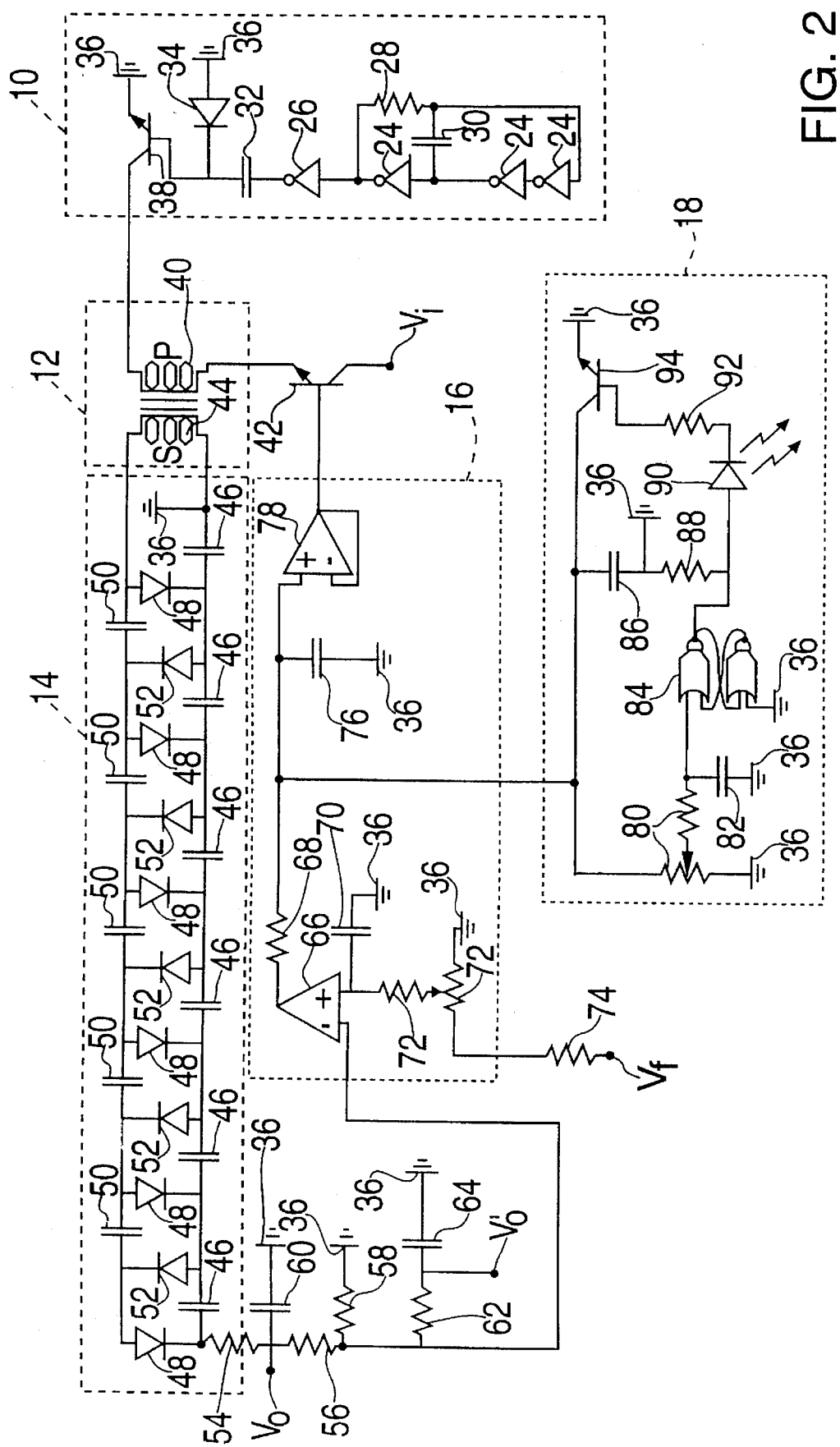
FIG. 2 is a schematic diagram illustrating one embodiment of the present invention.

FIG. 2 is a schematic illustration of one circuit configuration embodying the present invention. In FIG. 2, the oscillator 10 is composed of a plurality of oscillator inverters 24 and a buffer inverter 26. Two of the oscillator inverters 24 are in parallel with a capacitor 30. The third oscillator inverter 24 is in parallel with a resistor 28. The buffer inverter 26 is in series with a capacitor 32. One terminal of capacitor 32 is connected to the base of a darlington-pair transistor 38. Between transistor 38 and capacitor 32 is a diode 34 attached to ground 36. The emitter of the transistor 38 is connected to ground 36. The collector of transistor 38 is connected to the primary 40 of the transformer 12. The oscillator 10, consisting of three inverters 24, is set up in a feedback circuit to oscillate, for example, at around 5 kHz.

The output is buffered with an inverter 26, which is then connected to the primary of transformer 12. The transformer 12 may be a 1:10 step-up transformer, for example. The secondary 44 of the transformer 12 is coupled to the voltage multiplier 14. Voltage multiplier 14 is made up of a series of five voltage doubler diode and capacitor pairs formed by capacitors 46 and 50 and diodes 48 and 52. The voltage multiplier 14 multiplies the voltage found at the secondary 44 of transformer 12. Following resistor 54 at the output of the voltage multiplier 14 is the output voltage $V_o$ terminal. Following the output voltage $V_o$ terminal, are resistors 56 and 58. One end of resistor 58 is coupled to ground 36. Resistors 56 and 58 are in parallel with capacitor 60. One end of capacitor 60 is coupled to ground 36. Between resistors 56 and 58 is connected one end of resistor 62. The other end of resistor 62 is coupled to a capacitor 64. The other end of capacitor 64 is coupled to ground. Between resistor 62 and capacitor 64 output $V'_o$ is obtained. The output $V'_o$ is a fraction or a divided portion of the voltage found at output voltage $V_o$. A portion of the voltage found at $V_o$ is coupled to feedback control circuit 16. The portion of the voltage coupled to the feedback control circuit 16 may be 1/1000 that of the voltage at $V_o$. The feedback control circuit 16 includes a comparator 66 and a buffer 78. A divided portion of the voltage output $V_o$ is fed to the negative side of a comparator 66. The positive side of the comparator 66 is coupled to a variable voltage. The variable voltage is formed by variable resistor 72. The positive side of comparator 66 is also coupled to a capacitor 70. The other side of capacitor 70 is coupled to ground 36. The variable resistor 72 at one end is coupled to a resistor 74 and at another end is coupled to ground 36. The other end of resistor 74 is coupled to a voltage $V_f$. Voltage $V_f$ is used to adjust the output $V_o$. The output end of comparator 66 is coupled to a resistor 68. The other end of resistor 68 is coupled to the positive input of a buffer 78. Between the resistor 68 and the buffer 78 is coupled a capacitor 76. The other end of capacitor 76 is coupled to ground 36. The output of the buffer 78 is coupled to a transistor 42. The output of the buffer 78 is also fed into the negative input of the buffer 78. The output of the buffer 78 is coupled to the base of transistor 42. The emitter of transistor 42 is coupled to one side of primary 40 of transformer 12. The collector of transistor 42 is coupled to an input voltage $V_i$.

The divided output voltage is fed to the negative side of the comparator 66 and the positive side of the comparator 66 is fed by a variable voltage resulting in a level control for the high voltage output $V_o$. The comparator 66 forces the output to equal the input thus providing a feedback path and stabilizing the high voltage output $V_o$ to a range between zero and two thousand volts, for example. The output of the comparator 66 drives a buffer 78, which drives a darlington-pair transistor 42, which is connected to the other side of the primary 40 of the transformer 12, thus closing the feedback loop.

Between the comparator 66 and the buffer 78 of the feedback control 16 is coupled the protection circuit 18. One end of a variable resistor 80 is coupled to the feedback control 16. Another end of the variable resistor 80 is coupled to a capacitor 82 and the input of a J–K flip-flop 84. Another end of the variable resistor 80 is coupled to ground 36. The other end of the capacitor 82 is coupled to ground 36. One terminal of the J–K flip-flop 84 is coupled to ground 36. The output of J–K flip-flop 84 is coupled to a LED indicator 90. One end of a resistor 88 is also coupled to the output of J–K flip-flop 84. The other end of resistor 88 is coupled to ground 36 and a capacitor 86. The other end of capacitor 86 is coupled to one end of variable resistor 80 and the feedback control 16. One end of the capacitor 86 is also coupled to the collector of a NPN transistor 94. The emitter of the resist transistor 94 is coupled to ground 36. The base of transistor 94 is coupled through resistor 92 to the LED indicator 90. This protection circuit 18 has a J–K flip-flop 84, the purpose of which is to shut the high voltage supply off in the event the operator drives the power supply past a predetermined set point voltage limit. When the J–K flip-flop 84 latches, it turns on the transistor 94 which causes the LED indicator 90 to light, pulling down the comparator 66 output low in the feedback control 16. In turn, the high voltage drive is turned off, thus shutting off the output. If a short circuit is encountered at the output $V_o$, the comparator 66 tries to go to infinity to compensate for the drop in voltage. When this happens, it also trips the J–K flip-flop 84 and shuts down the circuit and shuts off the output voltage $V_o$.

The present invention, in providing a feedback control that is used to maintain an accurate and stable output voltage which is easily controlled over a range of preselected voltages and a protection circuit which provides a predetermined voltage limit and short circuit protection provides a power supply that has many advantages over present high voltage DC power supplies. Therefore, the present invention considerably advances the art of high voltage DC power supply. Additionally, the high voltage DC power supply of the present invention is easily adapted to De controlled by a computer, resulting in the easy automation of various applications, including applications in test equipment, or where a high voltage DC power supply is required to be stable, accurate, and protected from over-voltage and shortened circuits. Additionally, the present invention provides a stable direct current high voltage supply even over circuit thermal changes.

Additionally, although the preferred embodiment has been illustrated and described, it will be obvious to those skilled in the art that various modifications may be made without departing from the spirit and scope of this invention.

What is claimed is:

1. A direct current high voltage power supply comprising:
   oscillator means for providing a periodic signal output voltage;
   transformer means, coupled to the periodic signal output voltage of said oscillator means, for increasing the voltage of the periodic signal output voltage;
   multiplier means coupled to an output of said transformer means, for multiplying the voltage at the output of said transformer means;
   feedback control means, coupled to a divided portion of an output of said multiplier means, for providing feedback of the output of said multiplier means to said transformer means, wherein said feedback control means includes: a comparator; a variable resistor coupled to an input of said comparator; and a buffer coupled to an output of said comparator; and
   protection means, coupled to said feedback control means, for providing short circuit and over-voltage protection,
   whereby a stable, accurate, protected voltage is obtained.

2. A power supply as in claim 1 further comprising:
   a digital to analog converter coupled to said feedback control; and
   a computer coupled to said digital to analog converter,
   whereby said computer controls the power supply output voltage.

3. A power supply as in claim 1 wherein:
said oscillator includes a plurality of inverters set up in a feedback circuit to oscillate.

4. A power supply as in claim 1 wherein:
said transformer is a step-up transformer.

5. A power supply as in claim 1 wherein:
said voltage multiplier includes a plurality of voltage doubler diode and capacitor pairs.

6. A power supply as in claim 1 wherein:
said protection circuit includes a flip-flop; and
a transistor.

7. A direct current high voltage power supply as in claim 1 wherein said protection means includes:
a flip-flop;
a variable resistor coupled to an input of said flip-flop; and
a transistor coupled to an output of said flip-flop.

8. A direct current high voltage stable power supply comprising:
an oscillator including a plurality of inverters coupled to a first transistor;
a step-up transformer having a primary input and a secondary output, the primary output coupled to said oscillator;
a voltage multiplier including a plurality of voltage doubler capacitors and diode pairs coupled to the secondary output of said step-up transformer, said voltage multiplier having a high voltage output;
a plurality of resistors coupled to the high voltage output of said voltage multiplier, one of said plurality of resistors acting as a voltage divider for providing a divided output voltage;
a comparator having a negative input, a positive input and a comparator output, the negative input of said comparator coupled to the divided output voltage;
a variable resistor coupled to the positive input of said comparator;
a buffer having a buffer input and a buffer output, the buffer input coupled to the comparator output;
a second transistor, said second transistor having a base, emitter, and collector, the buffer output being coupled to the base of said second transistor, the emitter being coupled to the primary of said step-up transformer, and the collector being coupled to an input voltage; and
a protection circuit including a flip-flop and a third transistor, said protection circuit coupled to the buffer input and the comparator output,
whereby an accurate, stable high voltage output is obtained with short circuit and over voltage protection.

* * * * *